(12) United States Patent
Maier et al.

US010790627B2

(10) Patent No.: US 10,790,627 B2
(45) Date of Patent: Sep. 29, 2020

(54) CONNECTION APPARATUS ASSEMBLY OF AN ELECTRICAL DEVICE OR OF A STORED ENERGY SOURCE

(71) Applicant: Festool GmbH, Wendlingen (DE)

(72) Inventors: Peter Maier, Weilheim an der Teck (DE); Markus Schmid, Wendlingen (DE)

(73) Assignee: FESTOOL GmbH, Wendlingen (DE)

( * ) Notice: Subject to any disclaimer, the term of this patent is extended or adjusted under 35 U.S.C. 154(b) by 0 days.

(21) Appl. No.: 16/344,702

(22) PCT Filed: Oct. 18, 2017

(86) PCT No.: PCT/EP2017/076555
§ 371 (c)(1),
(2) Date: Apr. 24, 2019

(87) PCT Pub. No.: WO2018/077683
PCT Pub. Date: May 3, 2018

(65) Prior Publication Data
US 2019/0334302 A1    Oct. 31, 2019

(30) Foreign Application Priority Data
Oct. 25, 2016 (DE) .......................... 10 2016 120 329

(51) Int. Cl.
*H01R 27/00* (2006.01)
*B25F 5/02* (2006.01)
(Continued)

(52) U.S. Cl.
CPC .............. *H01R 27/00* (2013.01); *B25F 5/02* (2013.01); *H01M 2/1055* (2013.01); *H01M 2/30* (2013.01);
(Continued)

(58) Field of Classification Search
CPC ... H01R 27/00; H01R 13/113; H01M 2/1055; H01M 2/30; B25F 5/02
(Continued)

(56) References Cited

U.S. PATENT DOCUMENTS 7,567,058 B2 * 7/2009 Shimizu ................. B25F 5/02
320/106
7,618,741 B2  11/2009 Casalena et al.
(Continued)

FOREIGN PATENT DOCUMENTS

DE         20023631      *  5/2005
DE         20023631 U1      5/2005
(Continued)

*Primary Examiner* — Peter G Leigh
(74) *Attorney, Agent, or Firm* — Hoffmann & Baron, LLP

(57) ABSTRACT

A connection apparatus for electrically connecting a stored energy source to an electrical device having an electric drive motor, wherein the connection apparatus is part of the stored energy source or of the electrical device and can be connected to a connection apparatus of the electrical device or of the stored energy source, wherein the connection apparatuses have plug contours and counter plug contours, by means of which the stored energy source is interlockingly fastened to the electrical device in a fastening position, in which at least two electrical connections between the electrical device and the stored energy source having different potential, are each established by means of a pair of base contact elements and base counter contact elements of the connection apparatuses, said contact elements being in contact with each other, for the supply of electrical energy to the electrical device by the stored energy source.

35 Claims, 11 Drawing Sheets

(51) Int. Cl.
    *H01M 2/10*     (2006.01)
    *H01M 2/30*     (2006.01)
    *H01R 13/11*    (2006.01)
    *H01R 13/26*    (2006.01)
    *B25B 21/00*    (2006.01)

(52) U.S. Cl.
    CPC .......... *H01R 13/113* (2013.01); *H01R 13/26* (2013.01); *B25B 21/00* (2013.01); *H01M 2220/30* (2013.01)

(58) Field of Classification Search
    USPC ........................................ 439/218
    See application file for complete search history.

(56) References Cited

U.S. PATENT DOCUMENTS

| | | | |
|---|---|---|---|
| 7,944,174 B2 | 5/2011 | Casalena et al. | |
| 9,065,106 B2* | 6/2015 | Milbourne | H01M 2/1022 |
| 9,172,115 B2* | 10/2015 | Kolden | H01M 10/425 |
| 2003/0082439 A1 | 5/2003 | Sakakibara | |
| 2005/0264259 A1 | 12/2005 | Santana, Jr. | |
| 2008/0166624 A1* | 7/2008 | Teng | B25F 5/02 429/50 |
| 2009/0237012 A1 | 9/2009 | Yokoyama | |
| 2012/0045667 A1* | 2/2012 | Yoneda | H01M 2/1055 429/7 |
| 2012/0208048 A1* | 8/2012 | Ogura | H01M 2/1022 429/7 |
| 2013/0098646 A1* | 4/2013 | Funabashi | B25F 5/00 173/2 |
| 2013/0224539 A1* | 8/2013 | Hayashi | H01M 2/1055 429/82 |
| 2013/0280573 A1* | 10/2013 | Taga | H01M 2/1094 429/100 |
| 2016/0293909 A1* | 10/2016 | O'Sullivan | H01M 2/1022 |

FOREIGN PATENT DOCUMENTS

| | | |
|---|---|---|
| DE | 102010041765 A1 | 4/2012 |
| DE | 102014217987 A1 | 3/2016 |
| EP | 1989774 A1 | 11/2008 |
| EP | 2628428 A1 | 8/2013 |
| EP | 2822103 A1 | 1/2015 |
| EP | 2916367 A1 | 9/2015 |
| EP | 2996174 A1 | 3/2016 |
| EP | 3059781 A1 | 8/2016 |
| EP | 3086434 A1 | 10/2016 |
| EP | 3059781 B1 * | 4/2018 ............. H01M 2/30 |
| WO | 2016170119 A1 | 10/2016 |

* cited by examiner though only schematically, a lower half shell part of the casing, which accommodates the stored energy source, so to speak, while the other upper casing half shell is not shown in the drawing; and

CONNECTION APPARATUS ASSEMBLY OF AN ELECTRICAL DEVICE OR OF A STORED ENERGY SOURCE

This application claims priority based on an International Application filed under the Patent Cooperation Treaty, PCT/EP2017/076555, filed Oct. 18, 2017, which claims priority to DE 10 2016 120 329.7, filed Oct. 25, 2016.

BACKGROUND OF THE INVENTION

The invention relates to a connection apparatus for electrically connecting a stored energy source to an electrical device having an electric drive motor, in particular a machine tool or a suction device, wherein the connection apparatus is part of the stored energy source or of the electrical device and can be connected to a connection apparatus of the electrical device or of the stored energy source, wherein the connection apparatus and the connection apparatus of the respective other components, the stored energy source or the electrical device, comprise plug contours and counter plug contours interlockingly fitting one another, by means of which the stored energy source is interlockingly fastened to the electrical device in a fastening position, whereby at least two electrical connections between the electrical device and the stored energy source having different potential, in particular a ground potential and a supply voltage, are each established by means of a pair of base contact elements and base counter contact elements of the connection contact assemblies of the connection apparatuses, said contact elements being in contact with each other, for the supply of electrical energy to the electrical device by the stored energy source.

It is standard practice for stored energy sources, for example battery packs, to be connectable to machine tools, for example handheld machine tools, or to suction devices, by means of electrical connection contact assemblies. Supply currents flow from the stored energy source to the electrical device via the electrical contacts of the connection contact assemblies, so that the drive motor can be operated. The electrical contacts are dimensioned accordingly for the currents required for this purpose.

However, the power consumption of electrical devices with drive motors is increasing. For higher power of an electrical device and a stored energy source providing correspondingly large currents, the demands on the connection contact assemblies are high.

SUMMARY OF THE INVENTION

It is therefore the object of the present invention to provide a connection apparatus for an electrical device, or a stored energy source, or both, of the type mentioned, which has improved electrical properties.

To achieve the object, it is provided in a connection apparatus of the type mentioned that the connection apparatus forms a connection apparatus of a first type and in addition to at least one base contact element, which is associated with one of the potentials, has at least one additional contact element associated with the base contact element and in particular the potential of the base contact element, which lies against an additional counter contact element of the connection apparatus, establishing electrical contact when connected to another connection apparatus of the first type, and stands free in a receptacle cavity of the other connection apparatus or lies against an insulating surface of the other connection apparatus, establishing no electrical connection between the connection apparatuses when connected to another connection apparatus of the second type.

A basic concept of the invention therefore has the intention of the connection apparatus being a new type of connection apparatus, a so-called first type, such that when the connection apparatus according to the invention is combined with a similar connection apparatus of this first type, the connection apparatus facilitates at least one additional electrical contact connection between the connection apparatuses via the additional contact element and the complementary additional counter contact element. Of course, a plurality of additional contact elements and additional counter contact elements can be provided for each electric potential, which readily increases the effective contact surface between the connection apparatuses with respect to the respective potential. Thus, larger currents can be transmitted between stored energy source and electrical device.

The base contact element and/or the base counter contact element may also be a single component part or may also comprise a plurality of contact elements or contact element sections. In principle, it is thus possible for a connection apparatus according to the invention to have at least one base contact element per potential or two or more base contact elements per potential; the counterpart thereto, the other connection apparatus of the first type or of the second type, then advantageously also has at least one base counter contact element, preferably several base counter contact elements.

However, the connection apparatus according to the invention is also compatible with, so to speak, older or conventional connection apparatuses, namely connection apparatuses of a second type. In these, only the base counter contact element is present, i.e. the at least one additional contact element is ineffective, so to speak, for example, is free in an accommodating cavity of the other connection apparatus (of the second type), thus cannot electrically transmit power or else lies against an insulating surface of this other connection apparatus of the second type, so also fulfils no electrical function.

With the additional contact element and additional counter contact element, additional contact surfaces are present, which for example reduce the contact resistance between the stored energy source and the electrical device. The additional contact surfaces also improve the electrical connection, for example in the event of vibrations. Higher continuous currents can be transmitted. In addition, for example, the number of plug cycles, i.e. the possibility of connecting the connection apparatuses to each other, can be increased.

The electrical device is, for example, a machine tool, in particular a handheld machine tool. For example, the electrical device is a screwing device, a sawing device, a separating device, a milling cutter, a gluing machine or the like. The electric motor drives a tool holder, for example, directly or via a transmission. The electric motor can also serve to drive the machine tool relative to a workpiece and/or to provide a processing material, for example a cover, in particular in the case of a gluing machine.

In the case of the suction device, the electric motor drives, for example, a suction turbine or forms part of a suction turbine or a suction unit. The electrical device can also be a semi-stationary machine tool, that is, for example, can be taken to a construction site, such as a table saw, mitre saw, slide saw, slide compound mitre saw or the like.

For example, a stored energy source interface, in particular a battery interface, is provided for the stored energy source on a foot or another location of a housing of the electrical device.

The stored energy source is, for example, a so-called battery pack. The stored energy source is preferably rechargeable. But it is also possible that the stored energy source, for example, comprises or has a fuel cell or other like source of electrical energy.

Preferably, the invention comprises or relates to a system comprising at least two connection apparatuses, one of which forms a connection apparatus of the first type and the other connection apparatus forms a connection apparatus likewise of the first type or of the second type. One connection apparatus forms part of the electrical device, the other connection apparatus forms part of the stored energy source. The system may also comprise other connection apparatuses, i.e. two connection apparatuses may be provided, which are compatible with the connection apparatus of the first type, one of which is a connection apparatus of the first type and the other of which is a connection apparatus of the second type.

A preferred concept provides that the base contact element and the additional contact element, which are associated with the same electric potential, are electrically connected to one another. It is likewise advantageous if the additional counter contact element and the base counter contact element, which belong to the same electric potential, are electrically connected to one another.

A base contact element and at least one additional contact element expediently form a group of contact elements that are associated with one and the same electric potential, for example the ground potential or a supply potential, in particular 12 V or 18 V DC voltage. Other base contact elements and/or additional contact elements may belong to this group. Furthermore, it is possible that in a connection apparatus of one, for example the first, type two or more base contact elements form a group of contact elements, which are associated with the same electric potential and no additional contact element is present, while in a connection apparatus of another, for example the second, type the group of contact elements associated with the same electric potential comprises at least one base contact element and at least one additional contact element.

A base counter contact element and at least one additional counter contact element advantageously form a group of contact elements which are associated with the same electric potential, for example the ground potential or a supply potential, in particular 12 V or 18 V DC voltage or even 48 V DC voltage. There may be other base counter contact elements and/or additional counter contact elements belonging to this group. It is possible that in a connection apparatus of one, for example the first, type two or more base counter contact elements form a group of contact elements, which are associated with the same electric potential and no additional counter contact element is present, while in a connection apparatus of another, for example the second, type the group of contact elements associated with the same electric potential comprises at least one base counter contact element and at least one additional counter contact element.

A preferred concept provides that the base contact elements or base counter contact elements associated with the same potential are accommodated with respect to the respective other electric potential in an electrically insulating receptacle, for example a plug receptacle or a plug projection, on which a plug receptacle can likewise be provided.

In a respective electrically insulating receptacle, the respective base contact element or the base counter contact element are expediently incorporated, as well as the respective associated additional contact element or additional counter contact element. Thus, it is provided that in a receptacle, for example, a base contact element and an additional contact element or a base counter contact element and an additional counter contact element are arranged. The base contact element and additional contact element or the base counter contact element and additional counter contact element are thus housed electrically insulated from other contact elements.

It is also advantageous if an associated base contact element is arranged on an electric potential, such as a ground potential or supply potential, when the connection apparatus is in the connected state, and a base counter contact element is arranged in a respective electrically insulating receptacle, insulated from contact elements of other electric potentials. If, for example, further base contact elements and base counter contact elements for other potentials are present, they are not arranged in the same receptacle as the aforementioned base contact elements, namely the base contact element and the base counter contact element.

Of course, it is advantageous if not only the base contact element and the base counter contact element are arranged in this electrically insulating receptacle, when the connection apparatuses are in the connected state, and expediently in contact with each other, but also one or more of the additional contact elements and/or additional counter contact elements. Thus, therefore, contact elements associated with a single potential are insulated from other contact elements, which are associated with other potentials, and are arranged in the electrically insulating receptacle, such as a plug receptacle.

It is preferred if the base contact element or the base counter contact element or both are arranged at a distance from an inner circumference of the electrically insulating receptacle. The inner circumference extends, for example, as a lateral surface around a plug axis, along which the contact elements can be attached to one another. The additional contact element and/or the additional counter contact element, however, are preferably arranged on the inner circumference of the electrically insulating receptacle. For example, the additional contact element or the additional counter contact element forms part of the inner peripheral wall or an inner peripheral wall of the electrically insulating receptacle. The other additional contact element or additional counter contact element, however, is preferably designed as a spring contact, which can then slide along the peripheral wall, which forms or has the additional contact element or additional counter contact element.

A preferred concept provides that, for example in the connection apparatus of the stored energy source, a plug receptacle is arranged or provided, in which at least one base counter contact element and at least one additional counter contact element are arranged. Between the at least one base contact element and the at least one additional counter contact element is an interval, for example transverse to a plug axis, along which the connection apparatuses are connected to each other, provided for receiving at least a section of an electrically insulating plug projection of the other connection apparatus. The or a base contact element and/or an additional counter contact element is provided, for example, in the plug projection or on the plug projection. In particular, the plug projection has a receptacle in which the base contact element of the other connection apparatus is incorporated.

It is advantageously provided that a respective base contact element or a respective base counter contact element is incorporated centrally in a plug receptacle or a plug projection of the respective connection apparatus. Central in this case, for example, means centrally transverse to a plug axis. Thus, preferably approximately equal distances exist between the respective base contact element or base counter contact element and an outer circumference of a respective plug receptacle or a plug projection, transverse to the plug axis.

The connection apparatuses can advantageously be connected to one another along a plug axis or plug path. The plug axis or plug path is preferably linear, whereby a curved plug path is also conceivable in principle.

It is preferably provided that the connection apparatuses can be fixed to one another using a latching device and/or a clamping device and/or a locking device. For example, the latch can block removal of the connection apparatuses and thus removal of the stored energy source from the electrical device along the plug axis or the plug path. A lock can be made for example by a catch acting transversely to the path of the plug or plug axis. The clamping device, latching device or locking device is expediently actuated by an actuating element in the direction of a release position, in which the electrical device and the stored energy source are separable from each other and/or the connection apparatuses are movable relative to each other.

In the design of the contact elements or their contact surfaces many variants are possible.

For example, the following may be provided for the base contact element, the base counter contact element, the additional contact element or the additional counter contact element:

The respective contact element may comprise, for example, a spring contact and/or a spring contact element and/or a contact strip and/or opposing contact elements, in particular blade contacts, for gripping a fixed blade contact surface in a pincer-like grip.

Preferably, however, the respective contact element may also comprise or be formed by a fixed contact surface and/or a contact surface which can be gripped pincer-like by counter contacts standing opposite each other, in particular a blade contact surface or a blade contact strip.

The blade contact surface engages, for example, between the opposing contact elements when the connection apparatuses are connected to one another.

It is preferable if one base contact element and base counter contact element or one additional contact element and additional counter contact element comprises a fixed contact surface, while the other comprises a resilient contact element or is formed thereby. In principle, it is therefore possible that, for example, the base contact element is or comprises a fixed contact surface, while the base counter contact element is a resilient component part or a resilient contact element. The other variant is also possible, in which the base contact element is a spring contact, which in the fixing position lies resiliently on the counterpart thereto, namely the base counter contact element.

It is also advantageous if the resilient contact element is flexible transverse to the plug axis or plug path. It is particularly advantageous if the resilient contact element has a contact projection which extends transverse to the plug axis or plug path.

If a plurality of contact elements, for example base contact elements and additional contact elements, have or form a contact projection, it is advantageous if at least two contact projections, preferably all contact projections, have approximately the same longitudinal positions with respect to the plug axis or plug path.

The fixed contact surface preferably extends parallel or substantially parallel to the plug axis or plug path. Thus, it is possible, for example, that the resilient contact element drags along the plug path or plug axis on the or a fixed contact surface, when the connection apparatuses and thus the stored energy source are connected together on the electrical device.

It should be noted that a resilient contact element can not only come into contact with a fixed contact surface, but that also the complementary contact element, that is the counter contact element, may be a resilient contact element.

It is expediently provided that all, in particular all fixed and/or all resilient, contact elements have approximately the same longitudinal extension with respect to the plug axis or plug path along which the connection apparatuses can be attached to one another, so that they engage or contact substantially concurrently or simultaneously with the complementary fixed contact surfaces, or with those fixed contact surfaces serving as a counterpart, or with the resilient contact elements.

It is advantageously provided that the contact elements of at least one connection apparatus has at least one pair of opposing contact elements, which are transverse to a plug direction, along which the contact elements can be connected to or inserted into the other contact elements of the other connection apparatus, being resilient or spring-loaded in a direction facing each other or in a direction facing away from each other. Thus, a pair of opposing contact elements, for example, a pair of two base contact elements or two additional contact elements or a pair of one base contact elements and one additional contact element may be provided, which are resilient or spring-loaded facing each other in a pincer-like fashion, wherein between the resilient or spring-loaded contact elements of this, for example, first connection apparatus at least one contact element of the other, for example second, connection apparatus can be connected, for example a base counter contact element and/or an additional counter contact element. But it is also possible that the contact elements of a, for example, first connection apparatus are resiliently facing away from each other transverse to the plug direction or plug axis, so that they can be connected, for example, between opposite surfaces, e.g. insulating surfaces and/or contact elements, of the other, for example, second, connection apparatus, and resiliently lie against the surfaces, that is the insulating surfaces or contact elements, of the second connection apparatus, for example from the inside and/or in a splayed configuration.

It is advantageous if the connection apparatus has resilient or spring-loaded contact elements arranged facing each other as base contact elements or base counter contact elements, arranged in the interior of a plug receptacle or a plug projection of the plug contours or the counter-plug contours, and additionally has at least one resilient or spring-loaded contact element as an additional contact element or additional counter contact element, said contact element being resilient or spring-loaded in one direction facing away from these two contact elements. Of course, two or more such additional contact elements or additional counter contact elements may be provided. The two resilient contact elements facing toward each other are provided, for example, for pincer-like contacting of a counter-contact element of the other connection apparatus, while in the connected state of the connection apparatuses, the at least one resilient or spring-loaded additional contact element or additional counter contact element facing away therefrom, for example, lies against an inner wall of a plug receptacle of the other connection apparatus or engages in the accommodating cavity. The inner wall may be the insulating surface or can be designed as an additional contact element or additional counter contact element.

In general, it is advantageous if at least one contact element, for example the base contact element or base counter contact element or the additional contact element or the additional counter contact element, has an insertion slope for sliding onto the respective other contact element. The insertion slope is expediently oblique with respect to the plug axis or plug path. The insertion slope is preferably provided on a resilient contact element. However, the insertion slope can also be provided on a fixed contact surface of a respective contact element.

Furthermore, preferably at least one contact element has a contact projection which projects transversely to the plug axis or plug path to the respective other contact element. The contact projection is expediently V-shaped, U-shaped or the like. In particular, the contact projection is expediently rounded or has a curved course.

It is advantageously provided that a plug projection or a plug receptacle of a connection apparatus of the first type, which comprises at least one base contact element and an additional contact element, preferably at least two additional contact elements, is transverse to the plug axis or plug path with the same contour as a plug projection or a plug receptacle of a connection apparatus of the second type, which does not have an additional contact element (or additional counter contact element). This creates a high level of compatibility.

Furthermore, it is advantageous if one base contact element and base counter contact element or one additional contact element and additional counter contact element have contact sections arranged adjacent to each other transverse to the plug axis or plug path and/or extending along the plug axis, for example spring contact strips. Preferably, the contact sections are movable relative to each other, so that each contact section can maintain electrical contact with the respective complementary contact surface independently of the other contact section. For example, two or more contact sections, which belong to the same potential, can be arranged adjacent to one another along the plug path or plug axis, for example.

It should be noted at this point that the above-mentioned and subsequent embodiments may of course relate to one or more pairings of base contact elements and base counter contact element or additional contact element and additional counter contact element.

An advantageous embodiment provides that the base contact element or base counter contact element and the at least one additional contact element or additional counter contact element are arranged in a plug receptacle, wherein one of the contact elements is arranged free-standing in the plug receptacle and the other contact element is arranged on a side wall of the plug receptacle and/or forms the side wall. The plug receptacle is designed for example as a plug recess or as a blind hole. The plug receptacle has, for example, a U-shaped or V-shaped cross section.

For example, it is advantageous if e.g. the base contact element or base counter contact element is arranged freely in the plug receptacle and the at least one additional contact element or additional counter contact element is arranged on or forms a side wall of the plug receptacle.

Particularly preferred is an embodiment in which one of the contact elements is free in the plug receptacle and an additional contact element or an additional counter contact element is arranged on opposite sides or mutually angled sides of the plug receptacle respectively. In this way, one or more side walls can be used for the additional contacts or additional contact elements. At this point, the compatibility with the connection apparatuses of the second type is also clear. In this second type, for example, plug receptacles can be provided, in which one or more side walls provide insulation surfaces, so that the respective additional contact element (several can be provided) of the connection apparatus of the second type lie on these insulating surface surfaces in the fixing position.

A complementary situation is advantageously defined as follows. It is expediently provided that the base contact element and the at least one additional contact element or the base counter contact element and the additional counter contact element are configured as plug contacts projecting in front of a fixed contour of the respective connection apparatus or have such plug contacts. The plug contacts, for example, engage in the previously described plug receptacle. For example, the base contact elements or base counter contact elements, with which the plug contacts engage, are blade contacts, so for example provide a fixed contact surface. A base contact element or base counter contact element designed as a blade contact can for example engage between resilient plug contacts, which are accordingly in contact with the blade contact from opposite sides.

Preferably, so to speak for forming the base contacts (base contact element and/or base counter contact element), a blade contact interface is provided by the at least one base contact element and the at least one base counter contact element. This interface is present in connection apparatuses of both the first type and the second type. In addition, located adjacent to the blade contacts on at least one side, expediently on opposite sides of the blade contact interface or the base contact elements and base counter contact elements, there is at least one combination or pairing comprising an additional contact element and additional counter contact element.

For example, the base contact element or base counter contact element protrudes into the plug receptacle in the form of a contact strip and/or is arranged in the plug receptacle at a distance from side surfaces of the plug receptacle, in particular centrally. Arranged parallel to the contact strip in this case is at least one additional contact element or additional counter contact element, for example on a side wall adjacent to the contact strip.

It is preferred if the base contact element or the base counter contact element are arranged in the interior of a plug receptacle and respectively an additional contact element or additional counter contact element, in particular designed as a fixed contact surface, is arranged on at least two side walls of the plug receptacle. In a connection apparatus of the second type, an insulating surface or an accommodating cavity is advantageously provided instead of at least one of these additional contact elements or additional counter contact elements.

It is also advantageous if only fixed contact elements are provided in a respective plug receptacle, while the plug contact elements engaging in the plug receptacle are resiliently pliable. However, a fixed contact element may be pliable to a predetermined degree, for example, if it is made of metal, in particular of copper, aluminium or the like.

However, the resilient plug contact elements are structurally already designed so that they are resiliently pliable, for example, by a corresponding cross-sectional shape or the like.

An advantageous concept provides that one of the connection apparatuses has only fixed contact elements, the other connection apparatus has only resilient contact elements. In the case of the stored energy source, fixed contact elements or contact surfaces are provided for the base contacts (base contact element and/or base counter contact element) and the additional contacts (additional contact element and/or additional counter contact element), while resilient contact elements are preferred in the case of the electrical device. Connection apparatuses are also readily possible, which have both, namely resilient and non-resilient or fixed contact elements. However, it is preferred if, in the case of a connection apparatus, only resilient or only fixed contact elements are associated with a respective potential. It may, for example, be provided that fixed contact elements are provided, for example, to the one potential, for example a ground potential, with one connection apparatus, and resilient contact elements are provided with the other connection apparatus, while with respect to the other potential, such as a supply potential, the first-mentioned connection apparatus has resilient contact elements, while the other, second-mentioned, connection apparatus has fixed contact elements.

It is advantageously provided that the connection apparatus not only provides electrical energy for the power supply or supply of energy for the electrical device through the stored energy source, but additionally has a data interface. In particular, the connection apparatus expediently has at least one data contact assembly for establishing a data connection between the electrical device and the stored energy source. Thus, contacts of the data contact assembly are separate contacts from the contacts for the supply of electrical energy of the electrical device by the stored energy source. It should be mentioned, however, that of course data can also be transmitted via a power supply interface, namely the base contact elements and base counter contact elements as well as the additional contact elements and additional counter contact elements, for example in the form of modulated signals on the supply current.

The data contact assembly and the contact elements provided for the supply of energy, namely the base contact elements and the at least one additional contact element, preferably have a longitudinal spacing and/or a transverse spacing with respect to a plug axis, along which the connection apparatuses can be attached to one another, and/or are arranged in different planes.

Advantageously, no contact element of the data contact assembly is arranged in a plane which is oriented transversely, in particular perpendicular, in relation to one plug axis, along which the connection apparatuses are connected to each other, in which plane the supply of energy provided for the base contact element and the at least one additional contact element are arranged.

The base contact elements associated with the different potentials, if appropriate the respective additional contact elements associated with the base contact elements, are advantageously arranged in a row direction, in particular along a straight line, transverse, in particular perpendicular, to a plug axis, along which the connection apparatuses can be connected to one another. The base counter contact element and the respectively associated additional counter contact elements are then advantageously arranged in a row direction transverse, in particular perpendicular, to the plug axis, in particular along a straight line, adjacent to one another.

An advantageous concept provides a retrofittability or optional availability of a connection apparatus with additional contact elements or additional counter contact elements. It is preferably provided that at least one of these contact elements, i.e. at least one of the base contact element or the base counter contact element or the additional contact element and the additional counter contact element forms a component which is in particular releasably inserted on a main body of the respective connection apparatus. Thus, the respective contact element forms a plug contact element. On the main body, a corresponding plug receptacle or plug holder for the contact element is provided. An electrical plug contact or receptacle contact for the respective contact element is expediently present on the holder, so that the contact element can be connected to the electric potential to which it is associated, for example can be latched. It can be provided that the retrofitted contact element can be released again, for example by releasing the aforementioned latching. But it is also possible that the retrofitted contact element is not removable from the main body of the connection apparatus, for example because the latching is not releasable, because the contact element is welded or glued or the like.

It is preferable if the parts are principally identical. For example, it is provided that at least one pairing of base contact element and additional contact element comprises identical contact elements, for example spring tongues. But a pairing of base counter contact element and additional counter contact element may advantageously comprise identical contact elements. But it is also possible that the base contact element and the base counter contact elements and/or the additional contact elements and the additional counter contact elements comprise structurally identical contact elements.

It is preferred if the contact elements are arranged stacked one above the other transverse to a plug axis, along which the connection apparatuses are connected to each other.

An expedient concept provides that at least one pairing of base contact element and additional contact element and/or one pairing of base counter contact element and additional counter contact element have no distance or at most a minimal distance or longitudinal distance to each other with respect to a plug axis, along which the connection apparatuses are connected to each other, so that they come into electrical contact with the associated contact elements of the respective other connection apparatus simultaneously or at least substantially simultaneously. Thus, for example, the base contact element and the additional contact element are arranged substantially without distance or offset with respect to the plug axis, so that they come into electrical contact with the associated base counter contact element and the associated additional counter contact element substantially simultaneously when connecting the connection apparatuses.

It is also expedient if the plug contours and counter plug contours of the connection apparatuses of the first type and of the second type are substantially identical in contour and/or plug-compatible.

It is advantageously provided that a plug receptacle or a plug projection of a respective connection apparatus of the first type has a substantially identical contour or an entirely identical contour as a plug receptacle or a plug projection of a connection apparatus of the second type.

Furthermore, it is expedient if the connection apparatus has a pairing of base contact element and additional contact element or a pairing of base counter contact element and additional counter contact element with respect to at least two potentials, a ground potential and a different supply potential, in particular a DC voltage potential. When two such connection apparatuses are connected to each other, at least one base contact element and one base counter contact element and one additional contact element and one additional counter contact element come into electrical contact with each other for the ground potential and also at least one base contact element and one base counter contact element and one additional contact element and one additional counter contact element come into electrical contact with each other for the supply potential.

BRIEF DESCRIPTION OF THE DRAWINGS

Hereinafter, embodiments of the invention will be explained with reference to the drawings. In the drawings.

DETAILED DESCRIPTION

Figure 1:
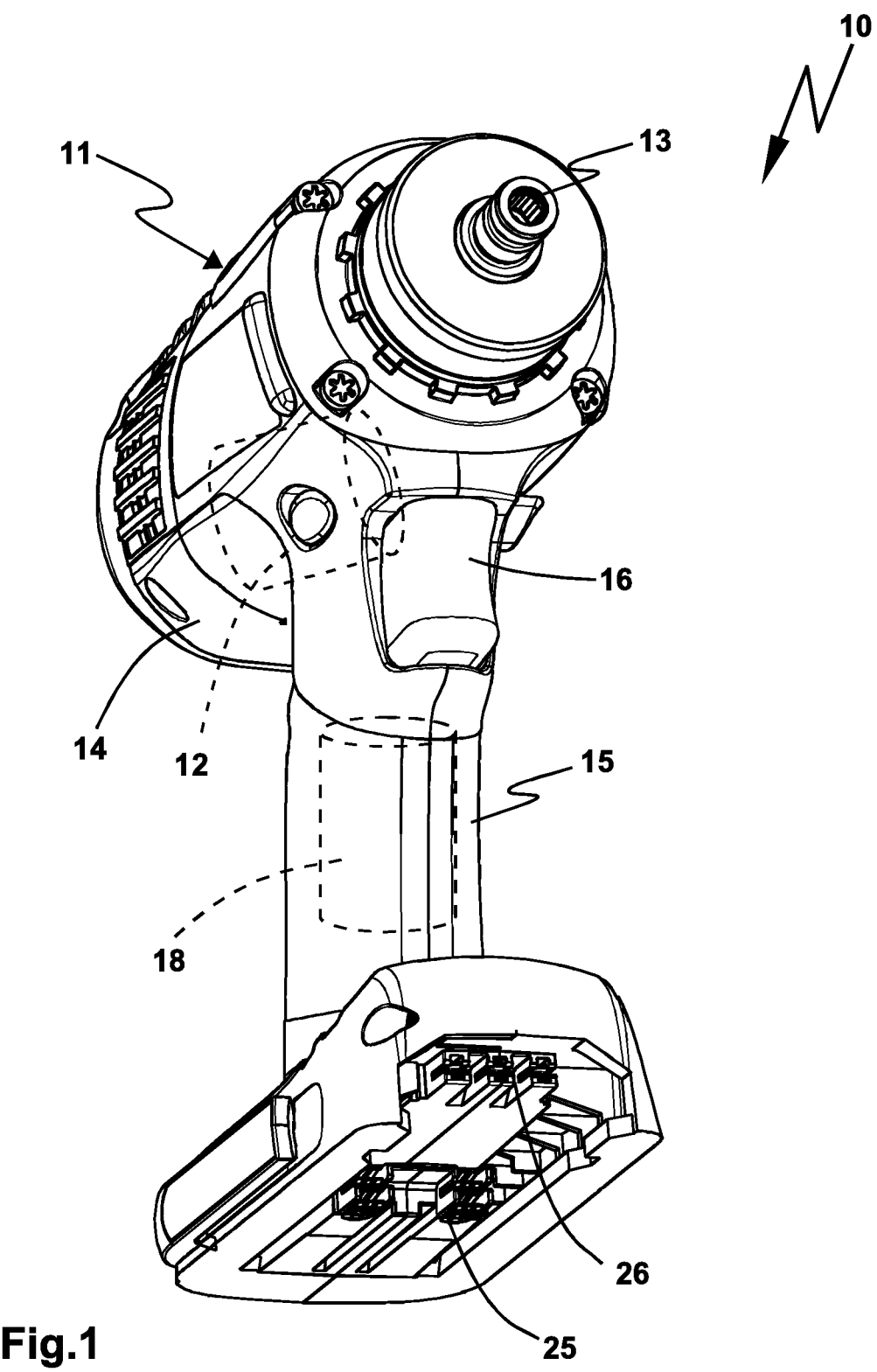
FIG. 1 an oblique perspective view of an electrical device with a connection apparatus of a first type, which in FIG. 2 is shown in an enlarged detail view, FIG. 3 a stored energy source with one of the connection apparatuses of a first type suitable for the electrical device according to FIGS. 1, 2 in a perspective view obliquely from above, FIG. 4 another electrical device shown approximately in the section corresponding to FIG. 2, but with a connection apparatus of a second type, FIG. 5 a stored energy source which is suitable for the electrical device according to FIG. 4 with a connection apparatus of a second type, FIG. 6 a section through a detail of the connection apparatuses of the first type of the electrical device according to FIGS. 1, 2, which are connected to one another, and of the stored energy source according to FIG. 3, approximately along a section line A-A in FIG. 3, FIG. 7 a detail D1 from FIG. 6, FIG. 8 a detail view corresponding to the detail D1 in FIG. 6, wherein the stored energy source according to FIG. 5 is connected to its connection apparatus of the second type on the electrical device with the connection apparatus of the first type according to FIGS. 1, 2.
Figure 2:
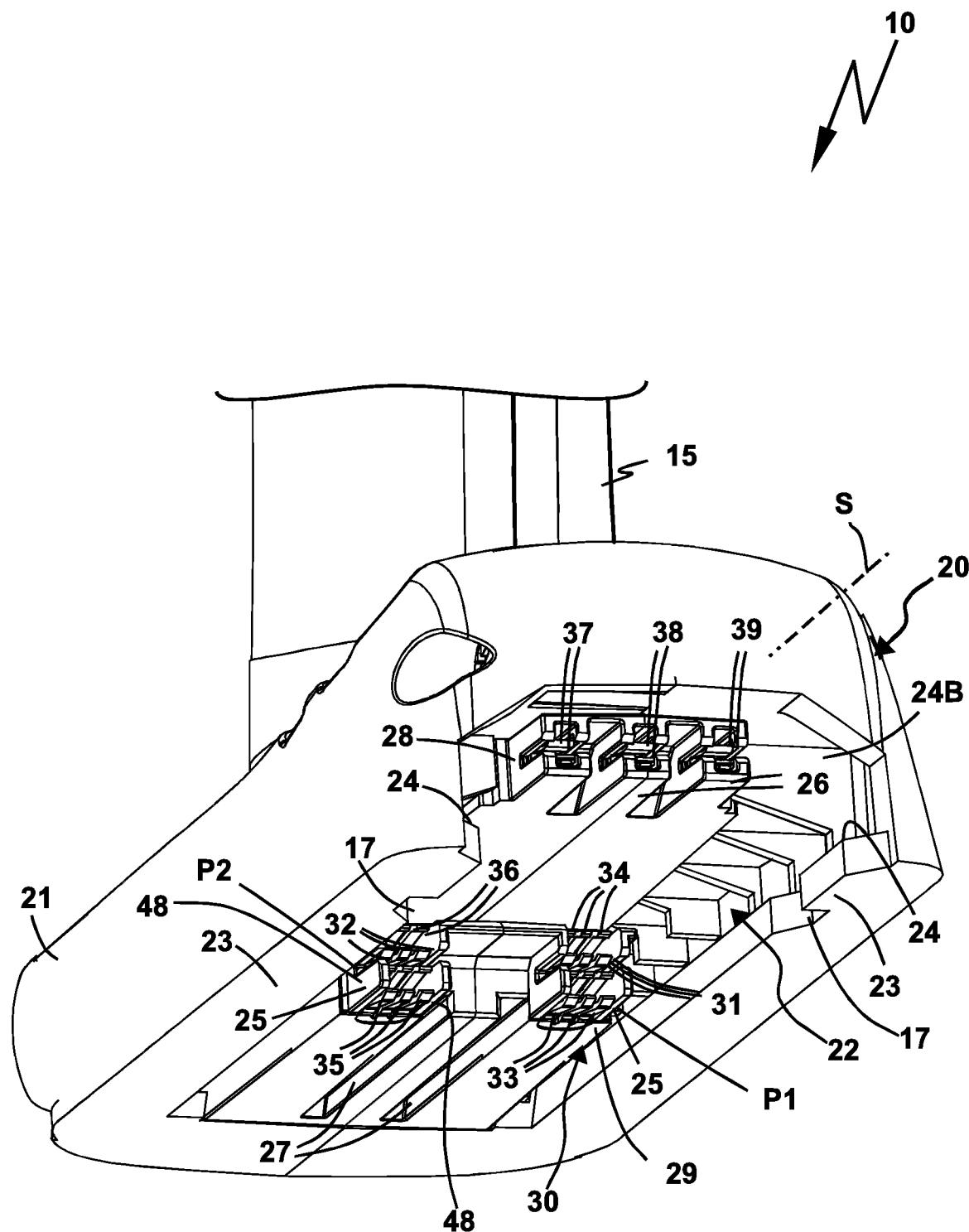
Figure 3:
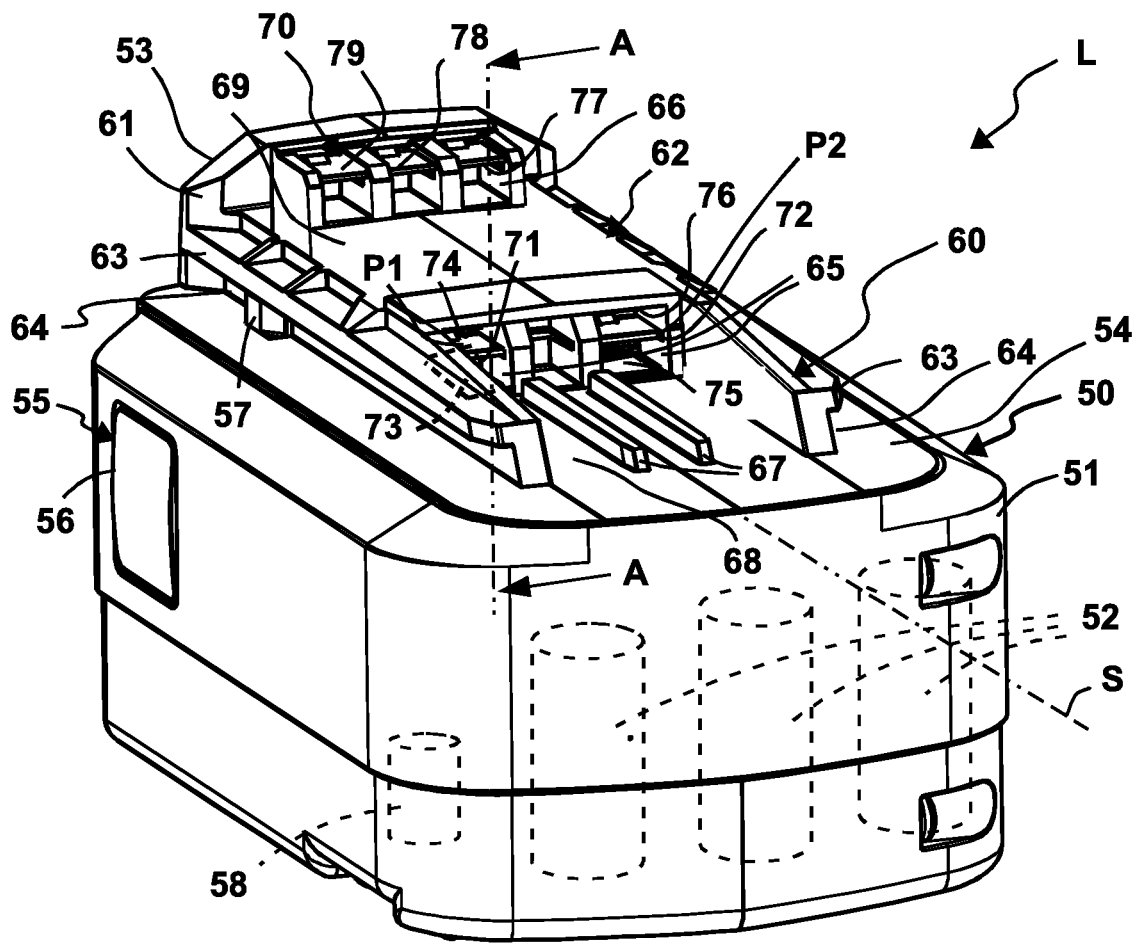
Figure 4:
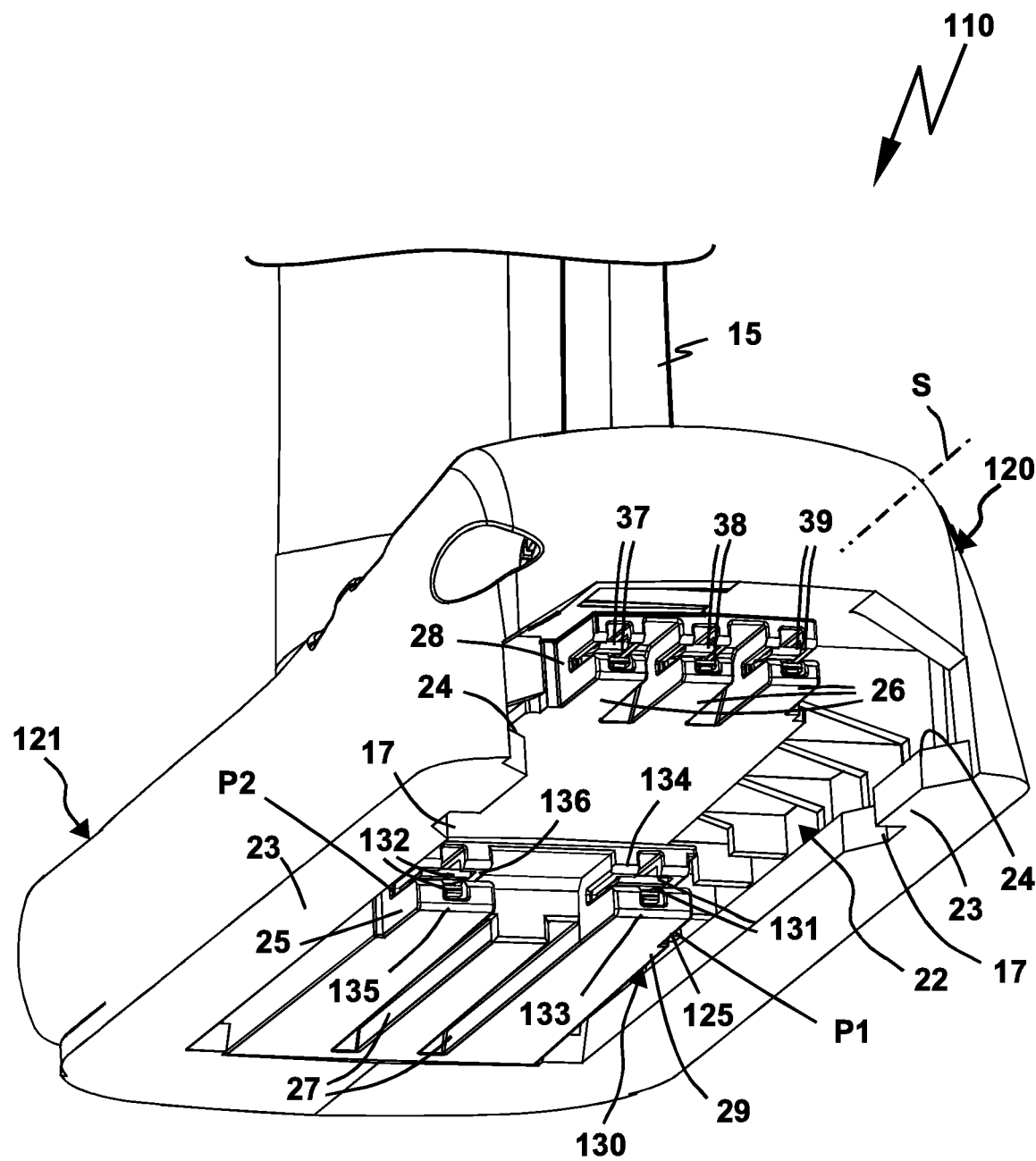
Figure 5:
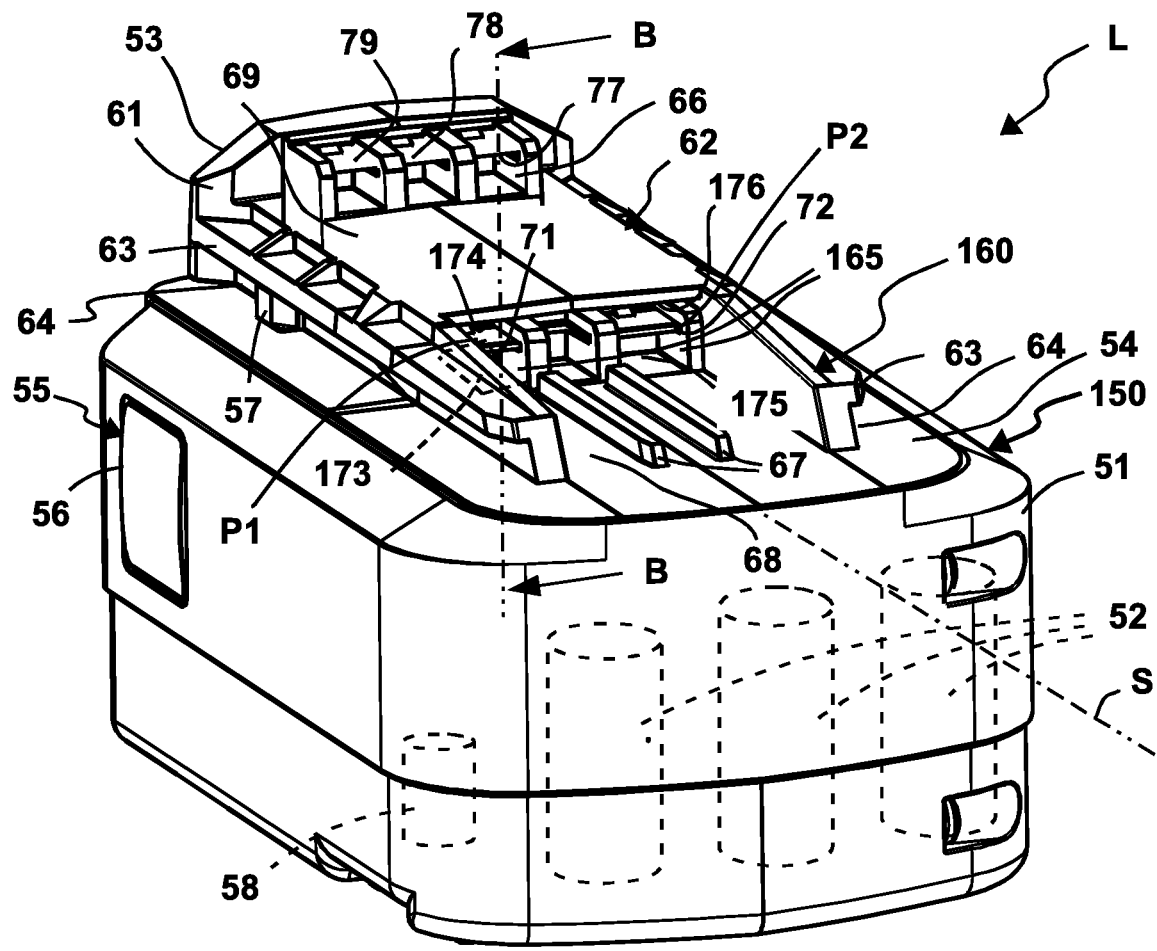

In FIGS. 1, 2, an electrical device 10 in the form of a handheld machine tool is shown, which essentially has the same basic components as an electrical device 110 according to FIG. 4, namely also a handheld machine tool, wherein the electrical devices 10, 110 have different stored energy source interfaces 20, 120 for the stored energy source 50, 150 illustrated in FIGS. 3 and 5.

In a housing 11 of the electrical device 10 is an electric drive motor 12 which drives a tool holder 13 directly or via a transmission. On the tool holder 13 a working tool, such as a screwdriver bit, a drill or the like can be arranged. At this point it should be noted that the design of the electrical device 10, for example, as a screwing device and/or drilling device is only one example. The electrical device 10, 110 could also be a sawing machine, a separating device, a gluing machine, a routing tool or even a semi-stationary device, for example a table saw or a mitre saw. Furthermore, the concept of the electrical devices 10, 110 in connection with the stored energy sources 50, 150 is also readily feasible in suction devices or the like other devices having an electric motor.

The drive motor 12 is arranged in a motor section 14 of the housing 11. From the motor section 14 a handgrip section 15 protrudes, which can be gripped or grasped by an operator. In the transition region between handgrip section 15 and motor section 14, a switch 16 for switching the electrical device 10, 110 on and/or off is provided, preferably for influencing the rotation speed of the drive motor 12. The drive motor 12 has a high power consumption, for example when screwing. Accordingly, large currents flow from the stored energy source 50 or 150 to the electrical device 10, 110, which can be achieved with high reliability and minimal effort in particular by combining the electrical device 10 and the stored energy source 50.

The electrical device 10 and the stored energy source 50 represent components according to the invention, but these are compatible with the conventional or hitherto known components, the appliance 110 and the stored energy source 150. As far as identical or similar components, in particular mechanical components, are present in the electrical devices 10, 110 and the stored energy sources 50, 150, these are provided with the same reference numerals and are explained only once. Different but functionally similar components are identified as far as possible by different reference numerals increased by "100".

A stored energy source receptacle 22 for the stored energy source 50, 150 is provided on a main body 21 of the stored energy source interface 20, 120. The stored energy source receptacle 22 is bounded laterally by guide projections 23 which each delimit a groove 24. Guide projections 63 can engage in the grooves 24, said guide projections being arranged on a holding section 62 of a housing 51 of the stored energy source 50, 150, in that the holding section can engage in the stored energy source receptacle 22. The grooves 64 are defined between a top wall 54 of the housing 51 and the guide projections 63.

The guide projections 63 project transversely to the plug axis S outwards, so that they can engage in the grooves 24. The guide projections 23 of the stored energy source interfaces 20, 120 engage in grooves 64 of the holding section 62.

The grooves 24, 64 and the guide projections 23, 63 extend along a plug axis S, along which the stored energy source 50, 150 can be connected to the stored energy source receptacle 22.

The stored energy sources 50, 150 can therefore be inserted into the stored energy source receptacle 22 along a plug path, which in the present case is rectilinear and thus defines the plug axis S, wherein the guide projections 23, 63 engage in the grooves 24, 64. At the end of this plugging movement, a raised section 53 of the main body 61 abuts against a recess 24B of the main body 21 or the stored energy source receptacle 22, so that the plugging movement ends. At the same time, latches or detents 57 arranged in the grooves 64 then latch into corresponding latch receptacles or detent receptacles 17 on the main body 21 and the stored energy source interface 20, 120, so that the stored energy source 50, 150 is locked with respect to the housing 11 of the electrical device 10, 110. It is then immovable with respect to the plug axis S. The stored energy sources 50, 150 then take a fastening position F relative to the electrical device 10, 110. In contrast, a release position L is shown in FIGS. 2 and 3 or 4 and 5.

The locking device 55, which may also be referred to as a detent device, can be released by at least one actuating element 56 (preferably two actuating elements 56 are provided), wherein, for example, the latches or detents 57 can be disengaged from the latch receptacles or detent receptacles 17. The latches 57 are preferably spring-loaded, so that they are spring-loaded with the latch receptacles/detent receptacles 17 in the direction of the locking position illustrated in FIGS. 3, 5, i.e. in the engaged position. When the locking device 55 is moved into the locking position, the stored energy source device 50, 150 can be removed from the housing 11 of the electrical device 10, 110 by a sliding movement along the plug axis S.

An additional guide or holder of the housing 51 on the main body 21 is preferably realised in that guide projections 67 are provided on an upper side wall 54 of the housing 51, which engage interlockingly in complementary guide receptacles of the stored energy source receptacle 22. The guide projections 67 are, for example, ribs.

The holding section 52 has a stepped shape, wherein starting from a higher level in the projection 53, a level 68 and then a level 69 is defined. In the area of the level 68, the guide projections 67 are provided. Corresponding thereto, the stored energy source receptacle 22 likewise has different levels, namely a level 28 associated with the level 68, as well as a level 29 associated with the level 69. Between the levels 28, 29 and 68, 69, a step is present, on which plug receptacles 65, 165 are arranged for receiving plug projections 25, 125 of the stored energy source interfaces 20, 120. At the higher level or level 69 more plug receptacles 66 are provided in the area of the projection 53, which can engage in the plug projections 26 of the stored energy source interfaces 20, 120. The plug projections 25, 125, 26 form, for example, plug contours 46 for engagement in counter-plug contours 86, which are provided by the plug receptacles 65, 165, 66. The grooves 24 and the guide projections 23 may form plug contours 46 for engagement in the counter-plug contours 86 in the form of the grooves 64 and the guide projections 63.

In the plug receptacles 66 are contact elements 77, 78, 79 for establishing electrical connections with contact elements 37, 38, 39 of the stored energy source interfaces 20, 120. The contact elements 77-79 comprise, for example, blade contacts which engage between a respective pair of contact elements 37-37, 38-38, 39-39 of the stored energy source interface 20, 120. It is understood, however, that only one respective individual contact element 37-39 can be provided which can come into contact with the respective other contact element 77-79 on one side.

The contact elements 37-39 and 77-79 form parts of a data contact assembly 70 via which electrical control data, for example in the context of an I²C bus, can be transmitted. The data contact assembly 70 further provides, for example, a logic supply potential for a controller 58, not shown in the drawing, of the stored energy source 50, 150. Via the data contact assembly 70, the controller 58 can communicate, for example, with a controller 18 of the electrical device 10, 110, in particular for charge management or discharge management of battery cells 52 of the stored energy source 50, 150.

The plug receptacles 65, 66 are each electrically insulating, i.e. the electrical contacts arranged in the one plug receptacle 65, 66, for example the base contact elements 31, 32 arranged in different receptacles 65, are respectively electrically insulated from each other, in that they are arranged in different receptacles 65 or 165. The same applies analogously to the additional contact elements 73, 74, which are electrically insulated against each other by being arranged in a respective plug receptacle 65, that is an electrically insulating receptacle 265, together with the respective base contact elements 31 or 32. Contact elements associated respectively with a potential P1 or P2 are thus respectively insulated from each other in a receptacle 265, in particular a plug receptacle 65.

The plug projections 125 form an electrical insulation for the additional counter contact elements arranged there. For example, electrically insulating receptacles 266 are provided in the plug projections 125, in which, for example, at least one base contact element 131A, 131B can respectively be arranged.

The stored energy source 50, 150 can supply the electrical device 10, 110 with electrical supply voltage, for example with potentials P1 and P2, via the battery cells 52 (there are a plurality of battery cells 52 electrically connected to one another). The potential P1 is, for example, a ground potential, the potential P2 is a supply potential with, for example, 15V or 18V or another DC voltage potential. The polarity of the potentials P1 and P2 should not be important hereinafter since it could also be different or just the opposite. It is essential, however, that a high current flow is possible from the stored energy source 50 to the electrical device 10.

Connection apparatuses 30, 130 of the electrical devices 10, 110 have base contact elements 31, 32 or 131, 132, which are associated with the potentials P1 and P2 and connection apparatuses 60, 160 of the stored energy sources 50, 150 are in electrical contact with base counter contact elements 71, 72, when the stored energy source 50, 150 is plugged into the electrical device 10, 110. The connection apparatuses 30, 60 are connection apparatuses of a first, novel type, while the connection apparatuses 130, 160 are, so to speak, conventional connection apparatuses, namely connection apparatuses of a second type. The base contact elements 31, 32 and 131, 132 form parts of a connection contact assembly 47. The associated counter contacts, the base counter contact elements 71, 72, are parts of a connection contact assembly 87.

The base counter contact elements 71, 72 are configured identically in the connection apparatuses 60, 160 and form blade contacts or contact elements which engage respectively between one pair of resilient base contact elements 31A, 31B and 131A, 131B, as can be seen in FIGS. 7, 8 and 10, 11. The base contact elements 32, 132 are also analogously constructed, i.e. they also each comprise a pair of opposed contact elements, not individually represented in the drawing, between which the base counter contact element 72 can engage.

The base contact elements 31, 32 each comprise a plurality of spring tongues 40, which are arranged adjacent to one another and can come into contact with the respective base counter contact element 71, 72. Intervals are present between the spring tongues 40 which extend along the plug axis S. The spring tongues 40 are movable relative to each other, so that in this way an optimal contact between the base contact elements 31, 32 and the base counter contact elements 71, 72 is established. In particular, this configuration is much less sensitive to vibrations occurring during operation of the electrical device 10, 110 than the configuration with a single spring tongue 140, as in the case of the base contact elements 131A, 131B. However, the spring tongues 140 can clamp sides of the base counter contact element 71 or 72 opposite each other. It is also possible that during operation of the electrical device 10, 110 one of the spring tongues 140 lifts off, so that the effective, electrically conductive transmission cross section from the stored energy source 150 to the electrical device 10 or 110 is smaller. The arrangement comprising so-called multi-part or multiple spring tongues 40 in the stored energy source 50 and its connection apparatus 60 is in contrast much less sensitive. For example, a spring tongue 40 can lift off from one side of the base counter contact element 71, 72, while the adjacent spring tongues 40 contacting the same side still remain in contact.

An additional measure, which increases the contact surface or the cross section effectively guiding or conducting the current, is provided by additional contact elements 33, 34 of the connection apparatus 30, which in the fixing position F, in which the stored energy source 50 is fixed to the electrical device 10, are in contact with additional counter contact elements 73, 74 of the connection apparatus 60. The additional counter contact element[s] 73, 74 are provided on side walls of the plug receptacles 65. The base counter contact element[s] 71 or 72 are provided between the additional counter contact elements 73, 74. The additional contact elements 33, 34 are designed as spring tongues 40, so that in this respect principally identical parts are available.

At the same time, these spring tongues 40 in the plug receptacles 165 of the connection apparatus 160 slide resiliently along insulating surfaces 173, 174 or 175, 176, which are provided there instead of additional counter contact elements 73, 74, 75, 76. Thus, therefore, the additional contact elements 73, 74 can be connected to the connection apparatus 160, without producing an electrical connection, but also without disrupting this. In this case, no current flows via the additional contact elements 33, 34, but only via the base contact elements 31, 32. This compatibility is recognised, for example, in FIG. 8. The new connection apparatus 30 of the electrical device 10 can therefore be coupled to a so-to-speak conventional stored energy source 150 without any functional restrictions being expected. At most, the current flow from the stored energy source device 150 to the electrical device 10 is smaller due to the smaller electrical transmission cross sections.

Instead of the insulating surfaces 173, 174, however, a further depression or other accommodating cavity, for example an accommodating cavity 273, 274, could also readily be provided. The spring tongues 40 would then be arranged freely and thus electrically insulated in the accommodating cavity 273, 274, when the connection apparatuses 30, 160 are connected to one another Variants are readily possible. For example, it is provided in the connection apparatuses 30, 60 that for each of the potentials P1 and P2 additional contacts are available. Thus, for example, even in the case of the potential P2 an arrangement with two additional contact elements 35, 36 can be provided, which can come into contact with additional counter contact elements 75, 76 of the connection apparatus 60. The additional counter contact elements 75, 76 are arranged, for example, on opposite sides of the base counter contact element 72 in the respective plug receptacle 65. However, it would also be readily possible to provide only one pairing of additional contact element and additional counter contact element or further such pairings, for example on further inner walls of the plug receptacles 65. For example, only one pairing of additional contact element 33 and additional counter contact element 73 may be provided, while the other pairing of additional contact element 34 and additional counter contact element 74 is not absolutely necessary in order to improve the power transmission capability between stored energy source and electrical device.

However, the stored energy source 150 is also compatible with both connection apparatuses 30, 130:

The plug projections 125 of the connection apparatus 120, which can engage in the plug receptacles 165 of the connection apparatus 60 or in the plug receptacles 65 of the connection apparatus 60, are designed such that they can be pushed past the additional counter contact elements 73-76 along the plug axis S, in order to bring the base contact elements 131A, 131B into electrical contact with the base counter contact element 71, 72. For example, plug sections 133, 134, 135, 136 of the plug projections 125 are provided instead of the additional contact elements 33-36 in the connection contact assembly 47.

The plug sections 133, 134 fit in a distance D2 between the additional counter contact elements 73, 74 and the counter contact elements 71 or 72.

In terms of the compatibility of the individual components 10, 110, 50, 150 with each other, the additional contact elements 33-36 of the connection contact assembly 47 delimit the same outer contour as the plug sections 133-136 of the plug projections 125 with respect to the cross section of the plug projections 25 transverse to the plug axis S. Thus, therefore, the plug projections 25, 125 are substantially equal in contour or exactly equal in contour transverse to the plug axis S.

The base contact elements 131 of the connection apparatus 130 are arranged in a protected manner between the plug projections 133, 134. In the case of the connection apparatus 30, on the other hand, the base contact elements 31, 32 project to form the plug projections 25 in front of a main body or the main body 21. Furthermore, the additional contact elements 33, 34 (or 35, 36) of the plug projections 25 are arranged free-standing.

It is advantageous if the side walls 48 protecting the respective contact elements are provided transverse to the plug axis S in the plug projections 25. The side walls 48 can dip into the plug receptacles 65. It should be noted that further contact elements, thus additional contact elements, can be provided. On the plug receptacles 65 further contact surfaces are provided for this case, which can come into contact with the electrically conductive side walls 48. In this embodiment, the side walls 48 would preferably be configured as spring contacts or be resilient. Alternatively, the inner walls of the plug receptacles 65 could also be configured as spring contacts for resilient engagement with the electrically conductive side walls 48.

The insertion movement along the plug axis S is also facilitated by the shape of the contact elements 41, which are formed by the spring tongues 40.

The contact elements 41 have contact projections 42 which extend transversely to the plug axis S and come into contact with the respective electrical counter contact element, for example the base contact element 71, 72 or one of the additional counter contact elements 73-76. Thus, sufficiently large contact surfaces are present. However, the contact projections 42 reduce the frictional resistance in the sliding movement along the plug axis S.

The contact projections 72 are arranged behind insertion slopes 43 with respect to the plug direction along the plug axis S. The insertion slopes 43 have an oblique course in relation to the plug axis S, so that they slide in the manner of a carriage on the respective opposite surface, for example, the base counter contact element 71 or the additional counter contact element 73 or also the insulating surface 173.

The contact elements 41 are fixed with holding sections 44 on the main body 21. The holding sections 44 may for example also serve as plug projections, which are plugged into corresponding plug receptacles of the main body 21 and are expediently latched, glued or fixed there in some other way. Between the holding sections 44 and the contact projections 42, spring sections 45 are provided which allow a resilient transverse mobility of the contact projections 42 transverse to the plug axis S.

The plug receptacles 65, 165 also expediently have insertion slopes 90, 190, which in particular facilitate the additional contact elements 33-36 in sliding up or sliding in. While the insertion slopes 190 of the plug receptacles 165 are formed directly by the base material of the main body or housing 51, the insertion slopes 90 are provided on the end faces of the additional counter contact elements 73-76.

Figure 6:
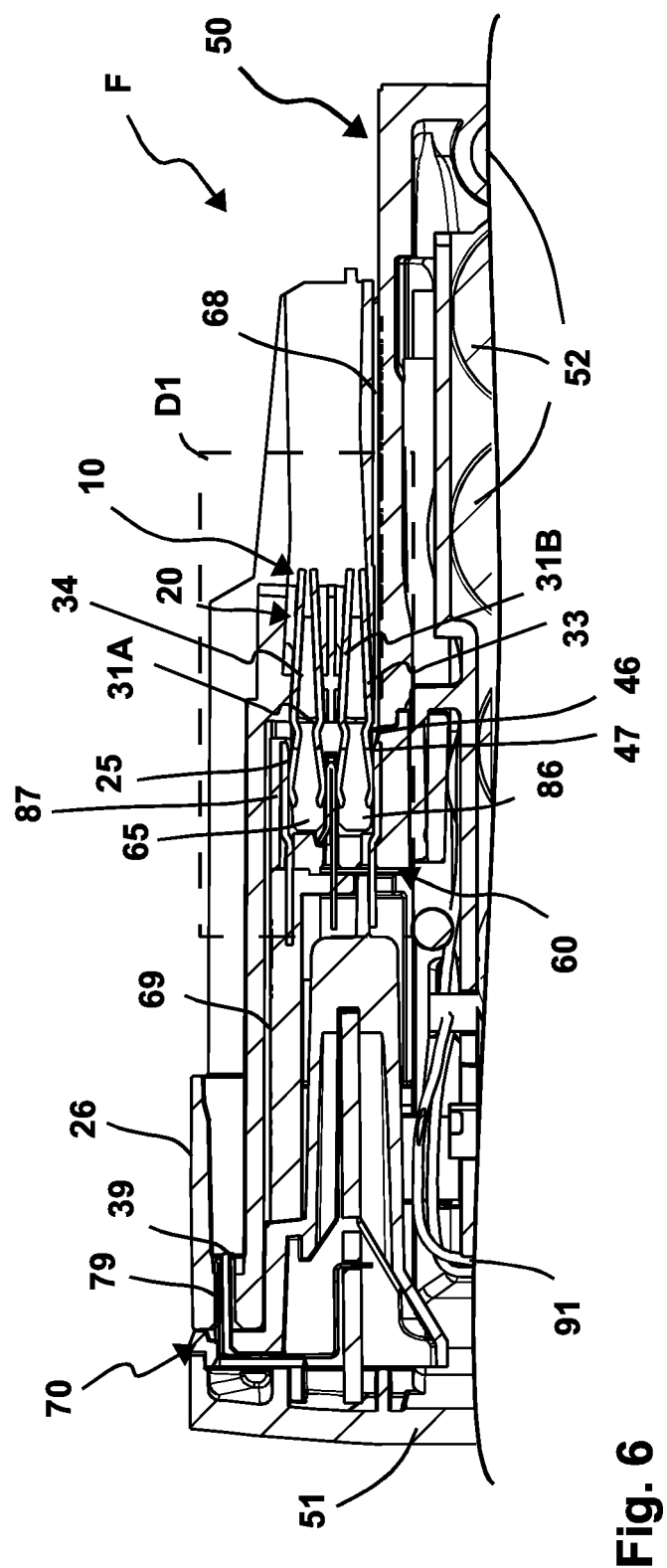
Figure 7:
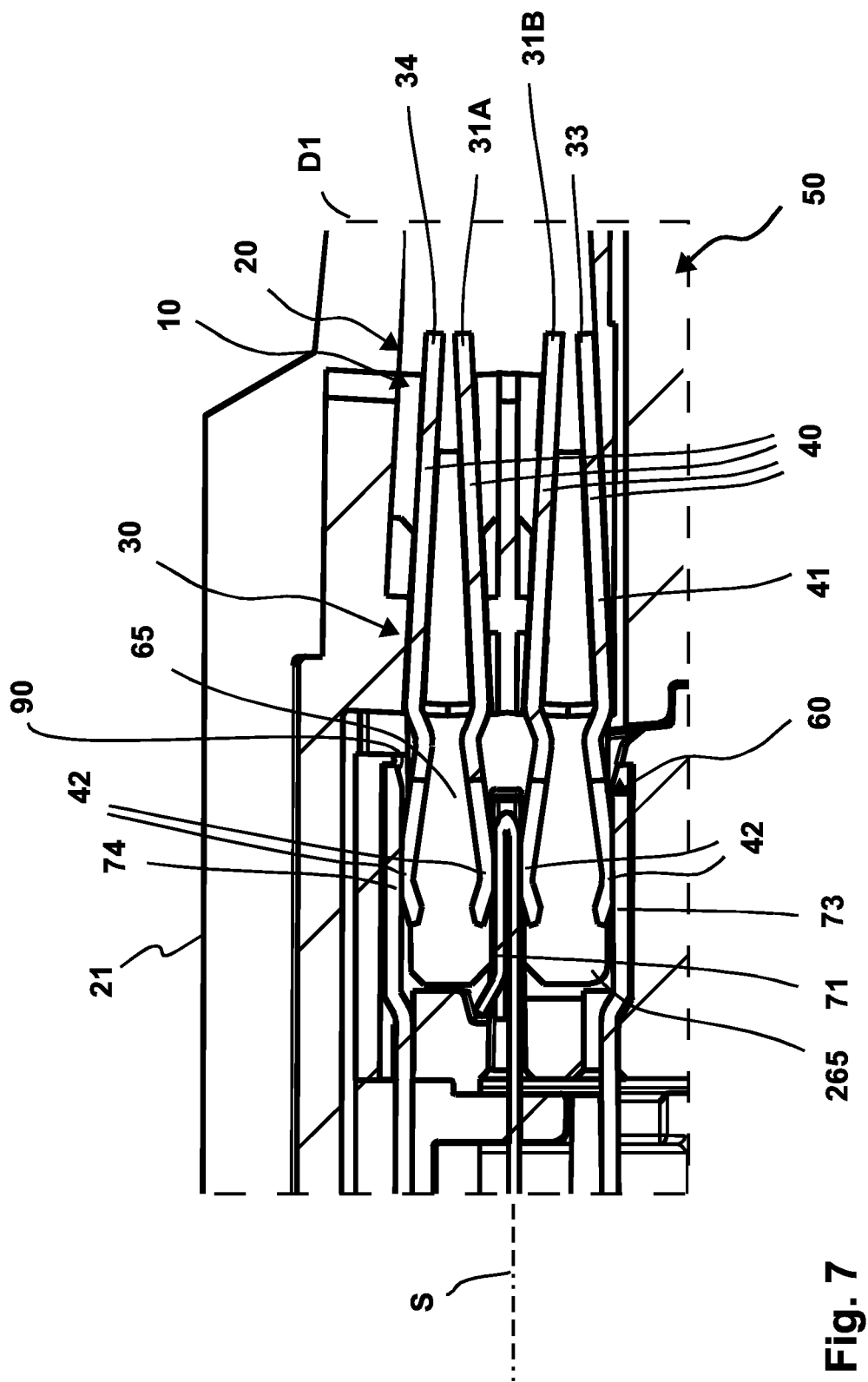
Figure 8:
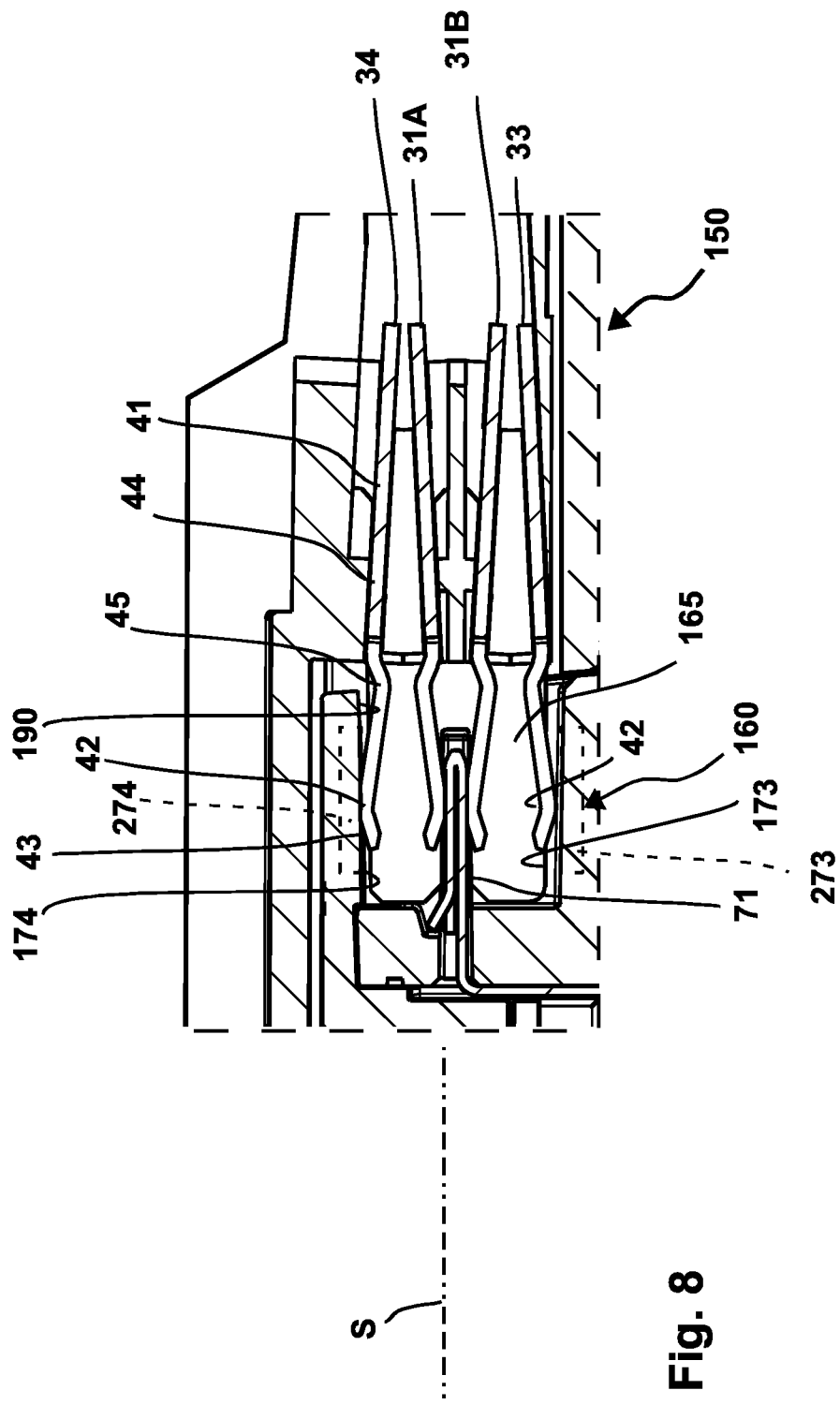
Figure 9:
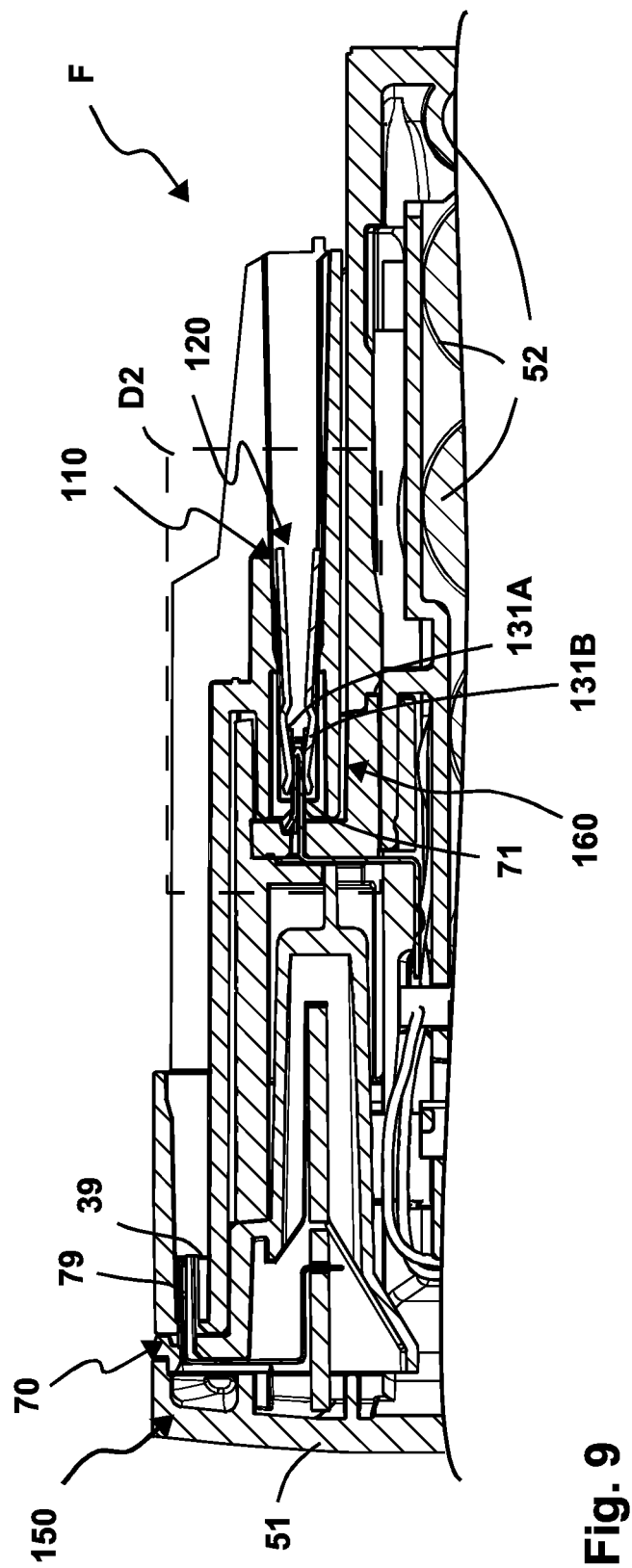
FIG. 9 a section through a detail of the connection apparatuses of the second type, which are connected to each other, of the electrical device according to FIG. 4 and of the stored energy source according to FIG. 5 approximately along a section line B-B in FIG. 5, FIG. 10 a detail D2 of FIG. 9, and FIG. 11 a detail view corresponding to detail D2 from FIG. 9, wherein the stored energy source according to FIG. 3 is connected to its connection apparatus of the first type on the electrical device according to FIG. 4 with the connection apparatus of the second type.
Figure 10:
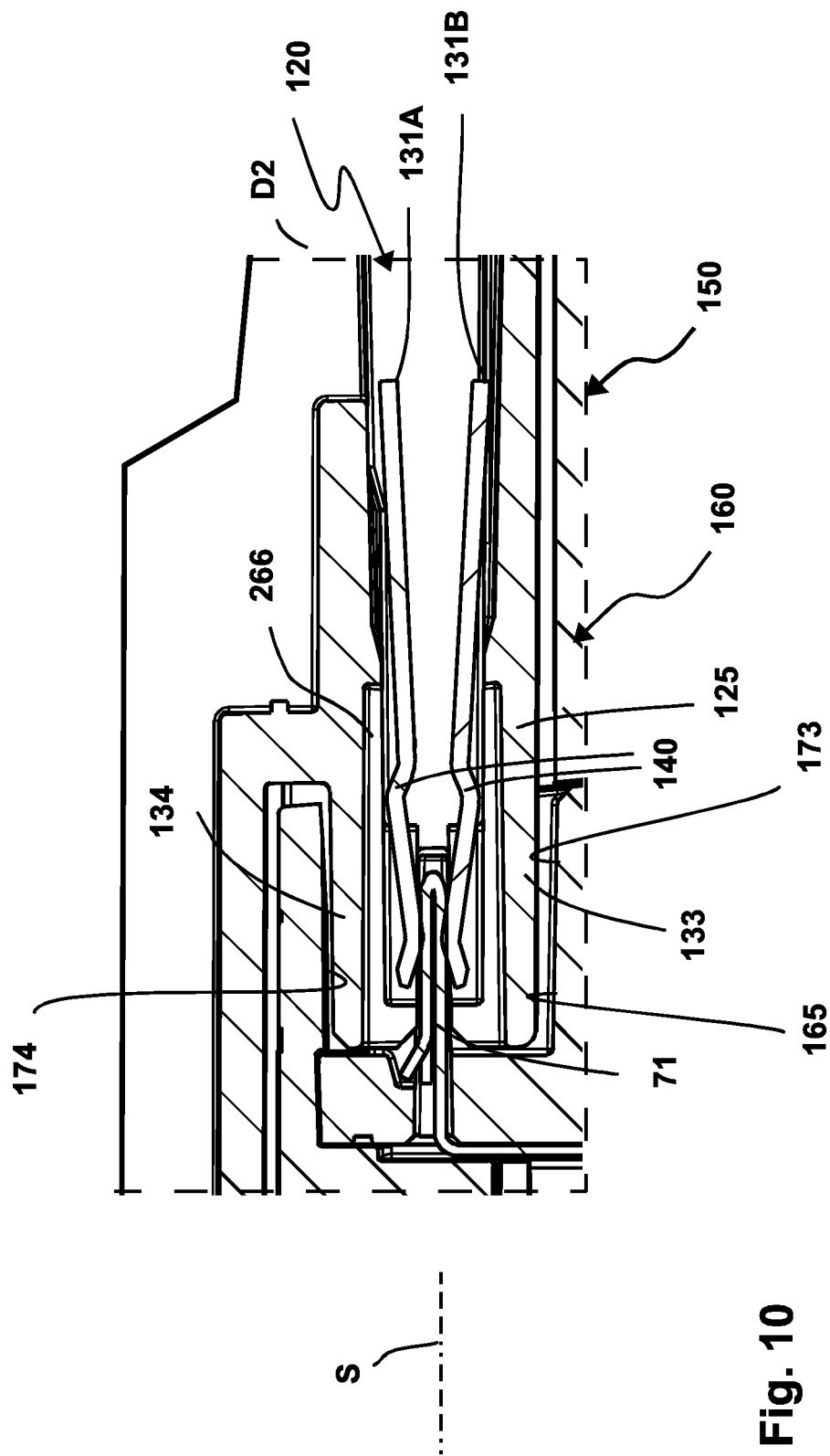
Figure 11:
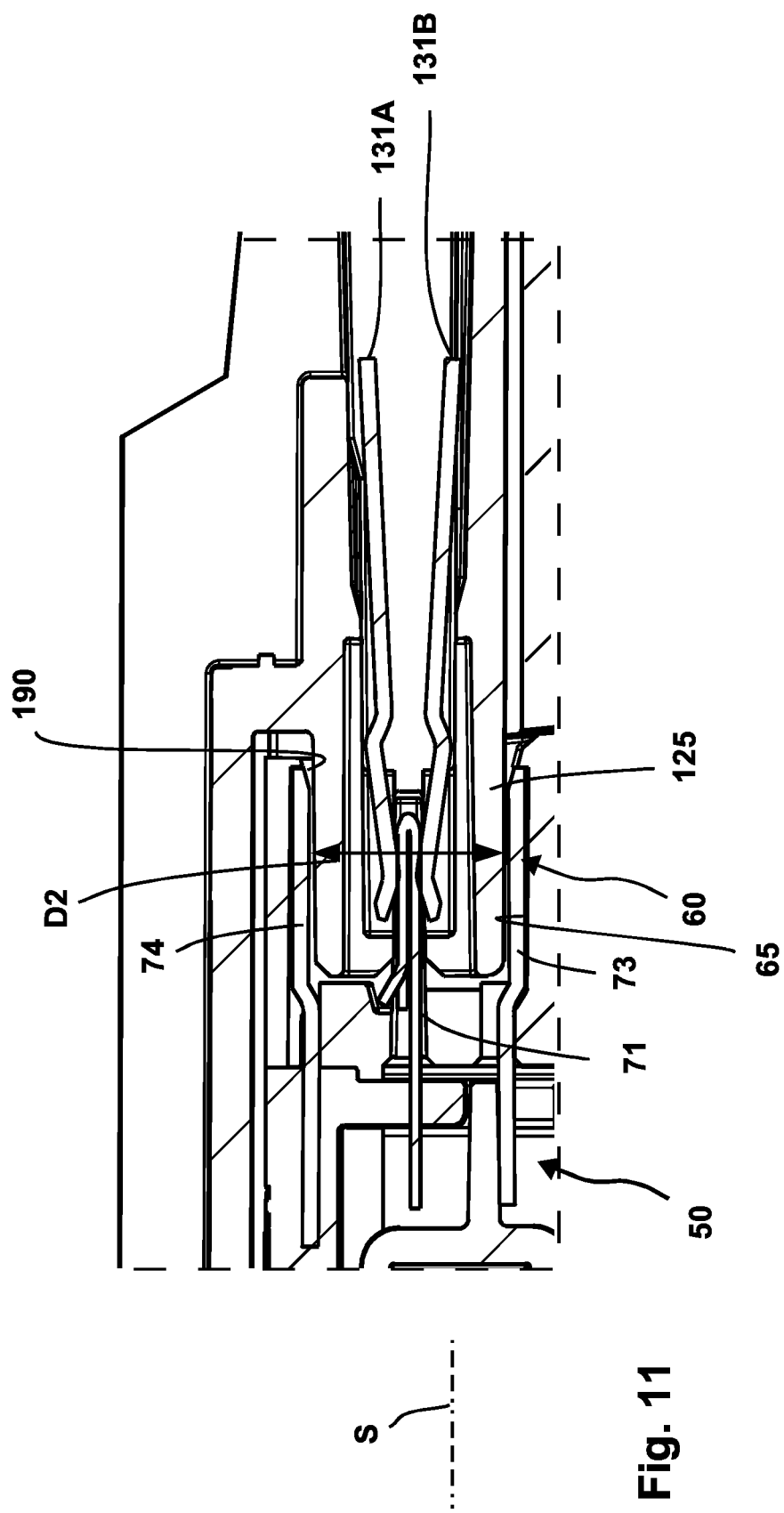

Of course, the respective contact elements of a respective potential are advantageously electrically connected to one another. By way of example, in FIG. 6, for example, a connecting line 91 is shown which, for example, belongs to the potential P1 and electrically connects the additional counter contact elements 74, 75 and the base counter contact element 71 to the battery cells 51.

In the context of the present description, the contact elements associated with the electrical device were referred to only as "contact elements", while the complementary, matching contact elements of the stored energy source 50, 150 were referred to as counter contact elements. This term, which has also been used in the general part of the description, is intended to facilitate the understanding of the invention. However, a connection apparatus according to the invention may contain both, namely contact elements or counter contact elements. The embodiment shown in the drawing must therefore be understood in that the counter contact elements of the stored energy source 50 or the connection apparatus 60 can form "contact elements" in the sense of a connection apparatus according to the invention. This becomes particularly clear through the design of the connection apparatus 60 of the stored energy source 50.

The invention thus relates in summary to a connection apparatus for electrically connecting a stored energy source to an electrical device having an electric drive motor, wherein the connection apparatus is a part of the stored energy source or of the electrical device and can be connected to a connection apparatus of the electrical device or of the stored energy source, wherein the connection apparatuses have plug contours and counter plug contours, by means of which the stored energy source is interlockingly fastened to the electrical device in a fastening position, in which at least two electrical connections between the electrical device and the stored energy source having different potential, in particular a ground potential and a supply voltage, are each established by means of a pair of base contact elements and base counter contact elements of the connection apparatuses, said contact elements being in contact with each other, for the supply of electrical energy to the electrical device by the stored energy source. The connection apparatus has, in addition to at least one base contact element associated with one of the potentials, at least one additional contact element, which is arranged adjacent to the base contact element and advantageously to the same potential as the at least one base contact element, and which, when the connection apparatus is connected to another connection apparatus of a first type, lies against an additional counter contact element of the other connection apparatus and, when the connection apparatus is connected to another connection apparatus of a second type, stands free in an accommodating cavity of the other connection apparatus or lies against an insulating surface of the other connection apparatus.

The invention claimed is:

1. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element, which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and wherein base contact elements respectively associated with the same electric potential or base counter contact elements are incorporated in an electrically insulating receptacle opposite to the respective other electric potential, and wherein the respective base contact element and the additional contact element or the base counter contact element and the additional counter contact element are incorporated in the respective electrically insulating receptacle, and wherein the base contact element and/or the base counter contact element are arranged at a distance from an inner circumference of the electrically insulating receptacle and the additional contact element and/or the additional counter contact element are arranged on the inner circumference of the electrically insulating receptacle.

2. The connection apparatus assembly according to claim 1, wherein the base contact element and the additional contact element or the base counter contact element and the additional counter contact element, which are associated with the same electric potential, are electrically connected together.

3. The connection apparatus assembly according to claim 1, wherein, when the connection apparatuses are connected, a base contact element associated with an electric potential and a base counter contact element are arranged in a respective electrically insulating receptacle insulated from contact elements of other electric potentials.

4. The connection apparatus assembly according to claim 3, wherein at least one additional contact element associated with the same electric potential as the base contact element and the base counter contact element and/or an additional counter contact element is arranged in the electrically insulating receptacle.

5. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element,
  which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and
  wherein a plug receptacle is arranged, in the connection apparatus of the stored energy source, in which at least one base counter contact element and at least one additional counter contact element are arranged, wherein there is a distance between the at least one base contact element and the at least one additional counter contact element for receiving at least a section of an electrically insulating plug projection of the respective other connection apparatus.

6. The connection apparatus assembly according to claim 5, wherein base contact elements respectively associated with the same electric potential or base counter contact elements are incorporated in an electrically insulating receptacle opposite to the respective other electric potential.

7. The connection apparatus assembly according to claim 6, wherein the respective base contact element and the additional contact element or the base counter contact element and the additional counter contact element are incorporated in the respective electrically insulating receptacle.

8. The connection apparatus assembly according to claim 5, wherein a respective base contact element or a respective base counter contact element is received centrally in a plug receptacle or a plug projection of the respective connection apparatus.

9. The connection apparatus assembly according to claim 5, wherein the at least one base contact element and/or the at least one base counter contact element and/or the at least one additional contact element and/or at least one additional counter contact element comprises or is formed by a spring contact and/or a spring contact element and/or a contact strip and/or opposing blade contacts, for pincer-like gripping of a fixed blade contact surface.

10. The connection apparatus assembly according to claim 5, wherein the connection apparatus assembly can be connected to the respective other connection apparatus along a plug axis or plug path.

11. The connection apparatus assembly according to claim 5, further comprising at least two contact elements facing each other and/or resilient or spring-loaded transverse to a plug axis, along which the connection apparatus can be connected to the respective other connection apparatus.

12. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element,
  which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and
  further comprising two contact elements facing each other and/or resilient or spring-loaded transverse to the plug axis for pincer-like gripping of a contact element of the other connection apparatus, and further comprising at least one further contact element which is arranged in an interval transverse to the plug axis adjacent to the contact elements.

13. The connection apparatus assembly according to claim 12, wherein the at least one further contact element is fixed or is transverse to the plug axis, resiliently or spring-loaded averted away from both of the other contact elements.

14. The connection apparatus assembly according to claim 12, wherein the connection apparatuses can be fixed to each other by means of a detent device and/or a clamping device and/or a locking device.

15. The connection apparatus assembly according to claim 12, wherein the at least one base contact element and/or the at least one base counter contact element and/or the at least one additional contact element and or the at least one additional counter contact element comprises or is formed by a fixed contact surface and/or a contact surface which can be grasped pincer-like by opposing counter contacts.

16. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element,
 which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and
 wherein the at least one base contact element and/or the at least one base counter contact element and/or the at least one additional contact element and or the at least one additional counter contact element comprises or is formed by a fixed contact surface and/or a contact surface which can be grasped pincer-like by opposing counter contacts, and
 wherein the fixed contact surface forms an inner wall surface, a plug receptacle or a plug projection of the connection apparatus, wherein the connection apparatus is a connection apparatus of the first type.

17. The connection apparatus assembly according to claim 16, wherein one base contact element and base counter contact element or one additional contact element and additional counter contact element comprises a fixed contact surface while the other one comprises or is formed by a resilient contact element.

18. The connection apparatus assembly according to claim 17, wherein the resilient contact element is resiliently transverse to the plug axis or plug path and/or the fixed contact surface extends parallel or substantially parallel to the plug axis or plug path.

19. The connection apparatus assembly according to claim 16, wherein the base contact element or base counter contact element and/or the additional contact element or the additional counter contact element has an insertion slope for sliding onto the respective other contact element and/or a contact projection which projects transverse to the plug path or plug axis to the respective other contact element.

20. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element,
 which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and
 wherein one base contact element and base counter contact element and/or one additional contact element and additional counter contact element has contact sections arranged transverse to the plug axis or plug path adjacent to each other and/or movable relative to each other.

21. The connection apparatus assembly according to claim 20, wherein the base contact element or base counter contact element and the at least one additional contact element or additional counter contact element are arranged in a plug receptacle.

22. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element, which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and wherein the base contact element or base counter contact element and the at least one additional contact element or additional counter contact element are arranged in a plug receptacle, and wherein one of the contact elements is arranged freestanding in the plug receptacle and the other contact element is arranged on a side wall of the plug receptacle.

23. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element, which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and wherein the base contact element or base counter contact element and the at least one additional contact element or additional counter contact element are arranged in a plug receptacle, and wherein an interval is provided between a base counter contact element and an additional counter contact element for receiving a plug projection or a section of a plug projection, wherein at least one base contact element is arranged in the plug projection for establishing electrical contact with the base counter contact element.

24. The connection apparatus assembly according to claim 23, wherein the plug projection is electrically insulating at least in the region of a base contact element.

25. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element, which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and wherein the base contact element and the at least one additional contact element or the base counter contact element and the additional counter contact element are configured as plug contacts protruding in front of a fixed contour of the respective connection apparatus.

26. A connection apparatus assembly for electrically connecting a stored energy source to an electrical device having an electric drive motor, wherein the connection apparatus assembly is part of the stored energy source and can be connected to a connection apparatus of the electrical device or is part of the electrical device and can be connected to a connection apparatus of the stored energy source, wherein the connection apparatus assembly and the connection apparatus of the respective other components, of the stored energy source or of the electrical device, comprise plug contours and counter plug contours interlockingly fitting one another, whereby the stored energy source is interlockingly fastened to the electrical device in a fastening position, whereby at least two electrical connections between the electrical device and the stored energy source having a ground potential and a supply voltage, are each established through a pair of base contact elements and base counter contact elements of the connection contact assemblies of the connection apparatuses, said contact elements being in contact with each other, for the supply of electrical energy to the electrical device by the stored energy source and wherein the connection device forms a connection device of a first type and, in addition to at least one base contact element associated with one of the potentials, has at least one additional contact element arranged adjacent to the base contact element and associated with the potential of the base contact element, which, when the connection apparatus assembly is connected to another connection apparatus assembly, lies against an additional counter contact element of the other connection apparatus assembly, establishing electrical contact and, when the connection apparatus assembly is connected to another connection apparatus assembly of a second type, does not establish any electrical connection between the connection apparatus assemblies, but stands free in an accommodating cavity of the other connection apparatus assembly or abuts against an insulating surface of the other connection apparatus assembly, and wherein the base contact element and the at least one additional contact element or the base counter contact element and the additional counter contact element is arranged adjacent to at least one side wall protecting the respective contact element, projecting in front of the fixed contour.

27. The connection apparatus assembly according to claim 26, further comprising at least one data contact assembly for establishing a data connection between the electrical device and the stored energy source, wherein contacts of the data contact assembly are separate from the contacts for supplying electrical energy to the electrical device by the stored energy source.

28. The connection apparatus assembly according to claim 26, wherein the connection apparatus assembly has exclusively fixed contact elements or exclusively resilient contact elements and/or exclusively plug receptacles for the contact elements of the respective other connection apparatus, wherein non yielding and/or fixed contact surfaces are provided in the plug receptacles.

29. The connection apparatus assembly according to claim 26, wherein at least one of a base contact element or a base counter contact element or an additional contact element or an additional counter contact element forms a component releasably connected to a main body of the respective connection apparatus assembly.

30. The connection apparatus assembly according to claim 26, wherein at least one pairing of base contact element and additional contact element and/or at least one pairing of base counter contact element and additional counter contact element comprises structurally identical contact elements.

31. The connection apparatus assembly according to claim 26, wherein at least one pairing of base contact element and additional contact element and/or at least one pairing of base counter contact element and additional counter contact element have no longitudinal distance from each other with respect to a plug axis, along which the connection apparatuses are connected to each other, or only such a small longitudinal distance from each other that they are in electrical contact with the associated contact elements of the respective other connection apparatus essentially simultaneously when the connection apparatuses are connected together.

32. The connection apparatus assembly according to claim 26, wherein a plug receptacle or a plug projection of a respective connection apparatus assembly of the first type has a substantially equal contour or an exactly equal contour to a plug receptacle or a plug projection of a connection apparatus assembly of the second type.

33. The connection apparatus assembly according to claim 26, wherein the plug contours and counter-plug contours of the connection apparatuses of the first type and the second type are substantially identical in contour and/or plug-compatible.

34. A system comprising a connection apparatus assembly according to claim 26, wherein the system comprises two connection apparatus assemblies, one of which constitutes a component of the electrical device and the other forms a part of the stored energy source, wherein at least one of the connection apparatus assemblies is a connection apparatus assembly of the first type and the other connection apparatus assembly is a connection apparatus assembly of the first or the second type.

35. An electrical device, in particular machine tool or suction device, or stored energy source, in particular with a design having at least one rechargeable battery cell, with a connection apparatus assembly according to claim 26.

* * * * *